A. D. LORD.
Improvement in Churns.
No. 130,730. 　　　　　Patented Aug. 20, 1872.
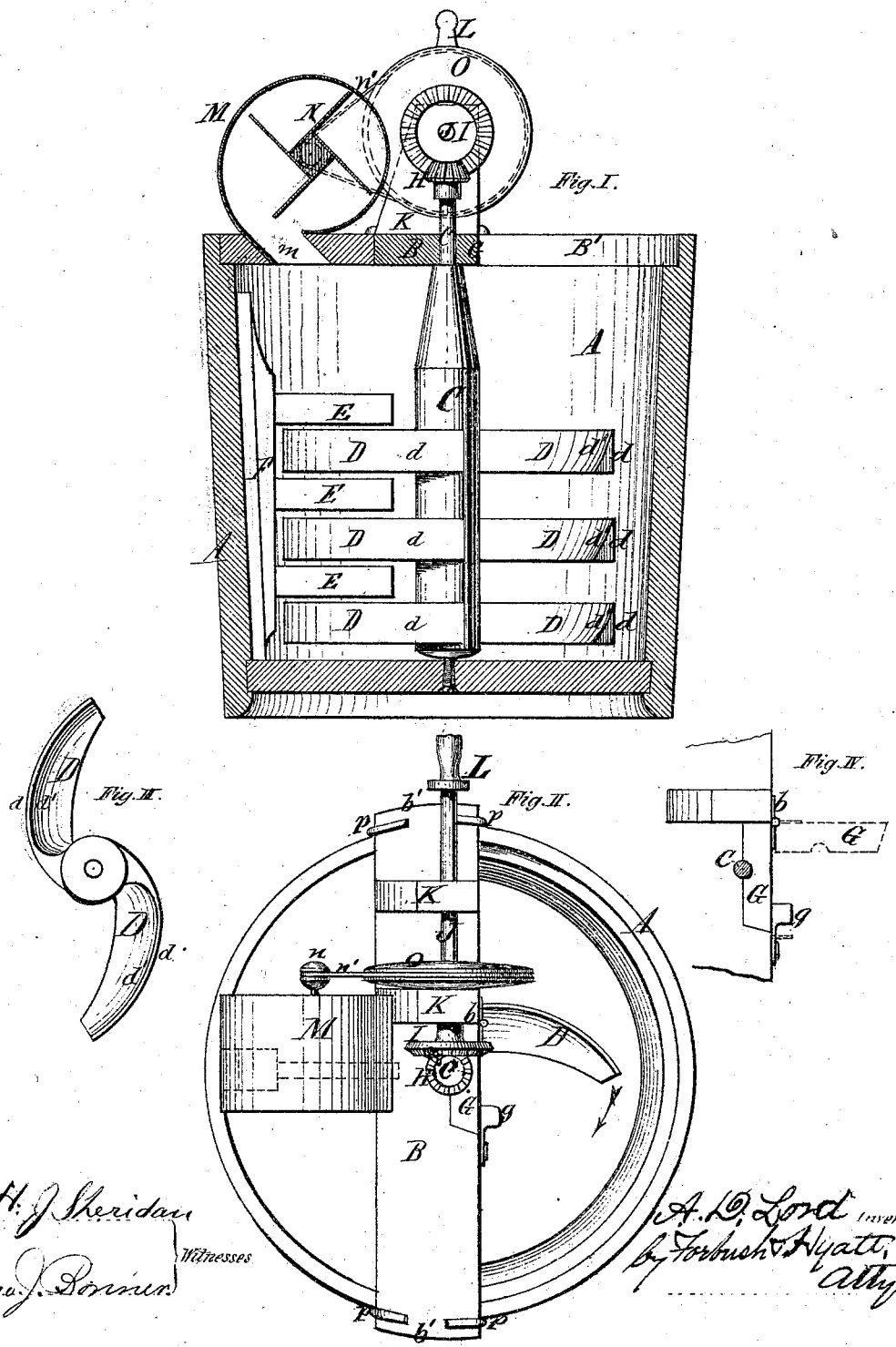

UNITED STATES PATENT OFFICE.

ALANSON D. LORD, OF BETHANY, ASSIGNOR TO CHARLES T. SHADBOLT, OF ATTICA, NEW YORK.

IMPROVEMENT IN CHURNS.

Specification forming part of Letters Patent No. 130,730, dated August 20, 1872.

SPECIFICATION.

I, ALANSON D. LORD, of Bethany, in the county of Genesee and State of New York, (assignor to CHARLES P. SHADBOLT, of Attica, Wyoming county, New York,) have invented certain Improvements in Churns, of which the following is a specification:

This invention has relation to churns; and it consists in the construction and novel arrangement of devices, whereby air is designed to be mechanically combined with the particles of cream in an efficient manner. The principle which I have adopted in this may be described briefly as follows: The cream is thrown upward and inward obliquely, by the peculiarly-shaped dashers, in such a manner that large openings are made under the waves thus formed, and into these openings atmospheric air is projected by means of a rotary fan placed on top of the casing, and having its chute, through which the air is passed directed downward and inward toward the center of the churn.

In the accompanying drawing, the letter A designates the churn-case, provided with the usual bevel-wheels I and H for rotating the shaft, which is marked C. M represents the fan-case placed on the top of the churn, and provided with a rotary fan, N, which is turned by a belt-and-pulley connection with the shaft of the operating-crank of churn. F represents a tapering side piece, provided with several stationary and horizontal arms, E, which extend radially inward toward the shaft of the dasher. This side piece with its arms extends inward, just under the opening of the air-passage from the fan, and forms a breaker to throw up the cream in a spray form at this point. Between these stationary arms of the side piece F, which is attached to the wall of the casing, play the horizontal arms of the rotating dasher, the commotion caused thereby serving to break the butter capsules of the cream. The dasher-arms D are placed on the shaft in pairs, one below another. Each pair consists of a central body and two curved arms. The body is cylindrical, and from it extend outward in a spiral direction two arms, D, each of which is concave on its face or advancing surface, the curvature extending from the advanced edge upward and rearward to the upper edge of the convex back. It is apparent from the spiral arrangement of these arms that their free ends act first on the cream, and with the greatest force, throwing it upward, rearward, and somewhat toward the center of the churn. Thus the lower dashers will bring up the cream from the bottom of the case, while the upper or surface dashers will throw the cream in the manner indicated above, forming two constantly advancing hollow conical waves having their large open ends outward. Toward these openings in the cream the air from the fan is directed obliquely downward and toward the center of the churn, by the arrangement of the fan-case and the oblique chute $m$ thereof, thus bringing the air into intimate and forcible contact with the particles of cream and butter capsules as they are thrown upward by the action of the dashers below against the breaker-arms E.

I am well aware that it is not new to force air into a churn by means of a fan. Hence I do not claim such invention; but

What I claim as my invention, and desire to secure by Letters Patent, is—

The vertical rotary churn herein described, provided with the fan N, and case M having oblique chute $m$, the breaker-arms radially arranged under said chute, and the dasher having the spiral concave arms D, all constructed and arranged to operate as shown and described.

ALANSON D. LORD.

Witnesses:
J. B. LUNDIS,
J. ZWETSCH.